United States Patent [19]

Fox et al.

[11] Patent Number: 4,488,335

[45] Date of Patent: Dec. 18, 1984

[54] HOT MELT ADHESIVE ATTACHMENT PAD

[75] Inventors: Robert L. Fox, Hayes; Alan W. Frizzill, Newport News; Bruce D. Little, Hampton; Donald J. Progar; Robert H. Coultrip, both of Yorktown; Richard H. Couch, Mathews; John R. Gleason, Hampton; Bland A. Stein; John D. Buckley, both of Newport News; Terry L. St. Clair, Poquoson, all of Va.

[73] Assignee: The United States of America as represented by the Administrator of the National Aeronautics and Space Administration, Washington, D.C.

[21] Appl. No.: 516,087

[22] Filed: Jul. 22, 1983

[51] Int. Cl.³ .................. A44B 21/00; B32B 15/08
[52] U.S. Cl. .................................. 24/304; 24/447; 24/450; 24/693; 156/273.7
[58] Field of Search ............... 24/304, 693, 447, 448, 24/449, 450, 451, 452, 397, 90 HA; 156/273.5, 273.7; 248/345.1, 467

[56] References Cited

U.S. PATENT DOCUMENTS 2,566,513 9/1951 Bischoff .
2,566,514 9/1951 Bischoff .
2,607,709 8/1952 Simpson et al. .
3,244,571 4/1966 Weisman ..................... 156/273.7
3,415,703 12/1968 Burgess .
3,505,144 4/1970 Kilduff et al. .
3,850,402 11/1974 Ando ................................ 248/476
3,925,126 12/1975 Leatherman et al. ........... 156/273.7
3,972,768 8/1976 Hill .
4,091,195 5/1978 Vitek .
4,110,506 8/1978 Cottingham et al. .
4,158,078 6/1979 Egger et al. .
4,208,458 6/1980 Wilson, Jr. .

Primary Examiner—Victor N. Sakran
Attorney, Agent, or Firm—Howard J. Osborn; John R. Manning

[57] ABSTRACT

The invention relates to a hot melt adhesive attachment pad for releasably securing distinct elements together and particularly useful in the construction industry or a spatial vacuum environment. The attachment pad consists primarily of a cloth 11 selectively impregnated with a charge of hot melt adhesive 12, a thermo-foil heater 13 and a thermo-cooler 14. These components are securely mounting in a mounting assembly 17 and 18. In operation, the operator activates the heating cycle transforming the hot melt adhesive to a substantially liquid state, positions the pad against the attachment surface, and activates the cooling cycle solidifying the adhesive and forming a strong, releasable bond.

18 Claims, 7 Drawing Figures

HOT MELT ADHESIVE ATTACHMENT PAD

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The successful operation of the Space Shuttle Program currently operated by the National Aeronautics and Space Administration has been aided by detailed preparation in anticipation of possible failures and providing corrective avenues in the eventuality of any foreseeable problems. One such provision is the development of repair techniques for replacing damaged or lost heat resistant tiles by the astronauts during the orbital portion of a space mission. The present invention, a hot melt adhesive attachment system, has been developed in conjunction with a Shuttle Work Restraint Unit for this purpose. The hot melt adhesive attachment system will releasably attach the work restraint unit to the heat resistant tiles bordering the repair site, without damaging the fragile tiles. In addition, the hot melt adhesive attachment system finds effective utility in the construction industry. Accordingly, this invention relates to a hot melt adhesive attachment pad for releasably securing an element to a surface, and in particular to an attachment pad suitable for use in the construction industry or a spatial vacuum environment.

Hot melt adhesives, commonly referred to as thermoplastic resins or thermoplastic adhesives, are well known for their ability to form a rapid, releasable bond. However, the inherent properties of hot melt adhesives have made the use of such adhesives cumbersome and messy; therefore, commercial and industrial applications are limited. Specifically, hot melt adhesives can only be applied to the surfaces of the elements to be bonded together when the adhesive is heated to a substantially liquid state. Thus, heretofore, conventional devices for applying hot melt adhesives required an expensive, intricate dispenser for dispensing quantities of the adhesive in a heated form. Alternately, the carpet seaming industry employs hot melt adhesive tapes in conjunction with specially designed heated irons.

Another device employing hot melt adhesives is the "Thermoplastic Control Complex", described in U.S. Pat. No. 4,110,506 to Cottingham et al. The thermoplastic control complex is an apparatus for releasably bonding distinct elements together and is comprised of an exothermic electrical conductor having a predetermined resistivity and selectively coated with hot melt adhesive. In operation, the complex is positioned between the elements to be joined, and the adhesive is heated to a semi-liquid state by resistive heat from the exothermic conductor. The adhesive then cools by dissipating heat to the environment, thereby solidifying and forming a strong, releasable bond. Resistive heat may be reapplied to melt the bonded adhesive and permit detachment of the elements. The thermoplastic control complex is the type of device normally used with hot melt adhesives; however, it has several objectionable features, such as: when the thermoplastic control complex is positioned between two elements such as two wooden boards which have poor heat transfer properties, the hot melt adhesive dissipates heat less rapidly, i.e., cools more slowly, thereby increasing the time needed to effect a secure bond. Such a feature is particularly objectionable when astronauts are repairing or replacing heat resistant Space Shuttle tiles during the orbital portion of a space mission. Heat transfer to the environment is extremely poor in a spatial vacuum environment, and further the Space Shuttle tiles have by design poor heat transfer properties. The astronaut normally hopes to make extravehicular repairs as rapidly as possible, but the hot melt adhesive of the thermoplastic control complex does not cool and the solidify sufficiently fast.

In addition, the thermoplastic control complex taught by Cottingham cannot be used for repeated attachment/detachment sequences. A large amount of hot melt adhesive is normally deposited on the attachment surface after detachment, thereby depleting the adhesive charge on the electrical conductor and preventing reattachment to another or the same attachment surface. Furthermore, the electrical conductor of the thermoplastic control complex normally has hard, unyielding surfaces which tend to mar or damage the attachment surface, especially a brittle, fragile attachment surface such as the surface of a heat resistant Space Shuttle tile.

Accordingly, it is an object of the present invention to provide a hot melt adhesive attachment system for releasably bonding distinct elements together.

A further object is to provide an attachment system suitable for use in construction or a spatial vacuum environment. A related object is to provide an attachment system which may be easily operated and controlled by an operator or astronaut.

Still a further object of the invention is to provide a releasable hot melt adhesive attachment system that is capable of repeated attachment/detachment sequences. A related object is to provide a hot melt adhesive attachment system which after detachment deposits a minimum amount of hot melt adhesive on the attachment surface.

Yet another object of the invention is to provide an attachment system which is lightweight, compact and durable, and may be used with a wide variety of thermoplastic adhesives.

Another object of the invention is to provide an attachment system with a soft, resilient surface to prevent damage to or marring of the attachment surface.

Still another object of the invention is to solve the problems of prior attachment systems and provide an attachment system which is not cumbersome or messy and has an active cooling system for rapid attachment.

SUMMARY OF THE INVENTION

These and other objects of the invention are attained by providing a hot melt adhesive attachment pad having a charge of hot melt adhesive selectively impregnated on a suitable fiberglass or equivalent cloth. A heating device and cooling device are oriented in close proximity to the hot melt adhesive impregnated cloth, such that the cloth may be heated or cooled in order to melt or solidify the adhesive. In the preferred embodiment, the heating device comprises a thermo-foil heater and the cooling device comprises a thermo-cooler with a metallic heat sink. These components are securely mounted in a retainer ring assembly. The retainer ring assembly may be rigidly or pivotally connected to a support plate. The attachment pad of the present invention may be controlled by a temperature controller with a temperature sensing means such as a thermocouple embedded in the cloth.

BRIEF DESCRIPTION OF THE DRAWINGS

A more complete appreciation of the invention and many of the attendant advantages thereof will be better understood as the invention becomes more apparent by reference to the following detailed description when considered in conjunction with the accompanying drawings, wherein.

DETAILED DESCRIPTION OF THE INVENTION

Figures 1, 3:
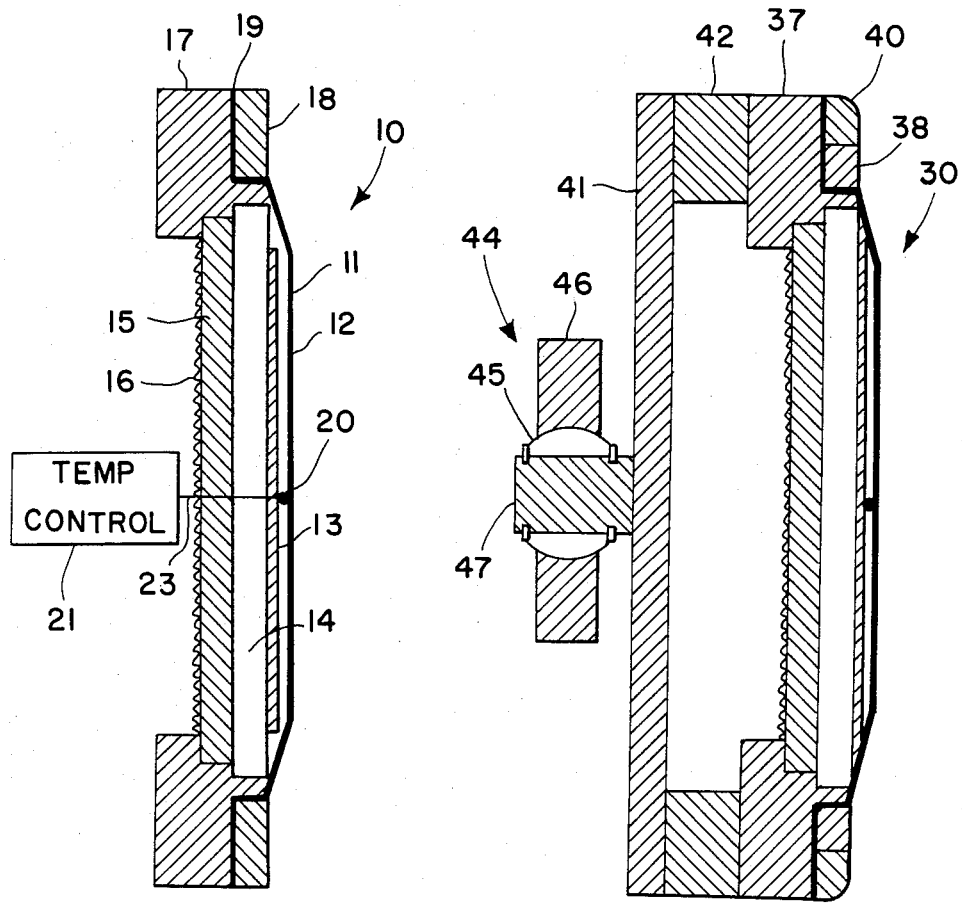
FIG. 1 is a cross-sectional side view of the invention hot melt attachment pad.
FIG. 3 is a cross-sectional side view of an alternate embodiment of the invention, showing an attachment pad with bumpers mounted on a swivel assembly.
Figure 2:
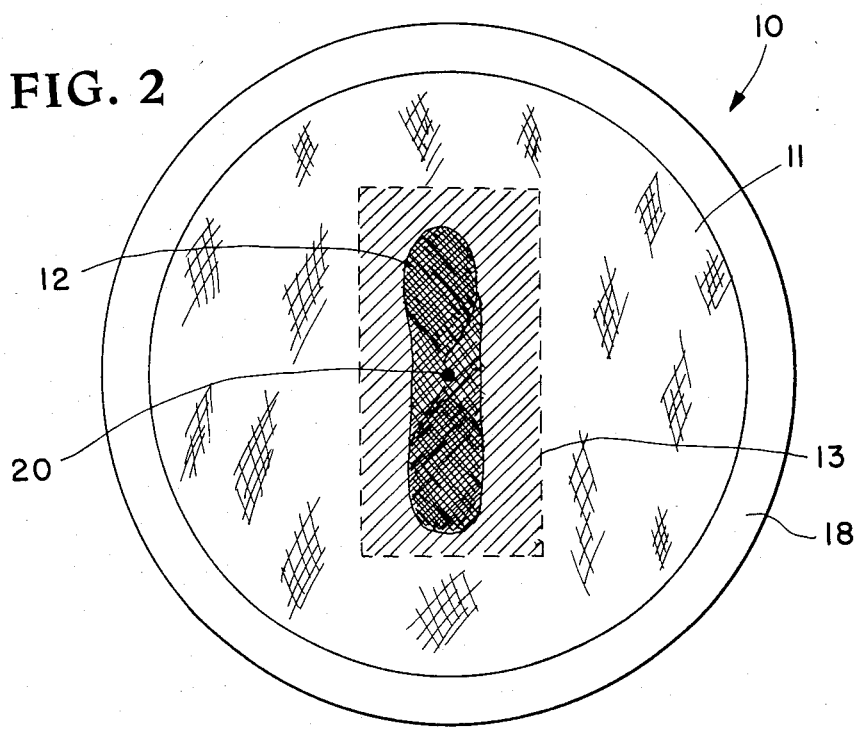
FIG. 2 is a top view of the cloth surface of the attachment pad showing the adhesive charge.

Referring now to the drawings and more particularly to FIG. 1, a cross-sectional side view of the invention hot melt adhesive attachment pad is shown and generally designated by reference numeral 10. The pad surface is constructed of a suitable fiberglass or equivalent cloth 11. A hot melt adhesive charge 12 is selectively impregnated on the fiberglass cloth 11. The fiberglass cloth 11 is stretched over a thermo-foil or other suitable heater 13. FIG. 2 is a top view of the hot melt adhesive attachment pad 10 showing the orientation of the fiberglass cloth 11, the hot melt adhesive charge 12 and the thermo-foil heater 13 (dashed lines). The hot melt adhesive 12 is disposed on the portion of the fiberglass cloth directly above the thermo-foil heater 13. In the embodiment described herein the pad unit is circular in section with a diameter of approximately 4 inches; however, in actuality the pad may be any shape or size to achieve a particular bonding strength or to accommodate a particular attachment surface geometry.

Referring now to FIG. 1, the thermo-foil heater 13 is adjacent to a cooling mechanism, which comprises a thermo-cooler 14 and a suitable heat sink 15. The thermo-cooler 14 is comprised of a series thermocouple junction in which current may be applied in either direction. In normal operation, the current is applied in a direction such that the thermo-cooler 14 conducts heat to the heat sink 15; however, the current may be reversed wherein the thermo-cooler 14 will operate as a heater to supplement or substitute for the thermo-foil heater 13 and permit emergency release of the attachment pad 10. Heat sink 15 is constructed from metal or any suitable conductor of heat, and the exposed surface 16 of heat sink 15 may be serrated to increase the surface area and coated with a high emittance material, thereby increasing the ability of heat sink 15 to radiate heat in a vacuum environment.

The aforementioned components are securely mounted in a mounting apparatus. In the illustrated embodiment, the mounting apparatus comprises a pair of mounting rings, designated by 17 and 18. The mounting rings are shaped in order to sandwich the fringe 19 of the fiberglass cloth 11, thereby holding cloth 11 between the inner opposing faces of the mounting rings. The mounting rings may be constructed from metal, fiber reinforced composite or other suitable material. FIG. 2 shows a top view of the attachment pad, wherein the circular mounting ring 18 is concentrically adjacent in section to the fiberglass cloth 11.

The invention attachment pad is controlled by temperature control means 21. In the illustrated embodiment, the temperature control means comprises a temperature controller (illustrated diagramatically) and connected by lines 23 to the temperature controller 21 is of the type known in the prior art and may include a power supply both of which are available commercially and a thermocouple 20 embedded in the fiberglass cloth 11. The temperature controller enables the operator to heat the pad through a wide range of temperatures, thereby permitting the use of many hot melt adhesives with a variety of melting ranges.

FIG. 3 shows a cross-sectional side view of the particular embodiment of the invention which will be used with the Space Shuttle work restraint unit, wherein the attachment pad 30 is secured to a pivoting assembly. In particular, the mounting rings, designated by 37 and 38, are securely attached to support plate 41 by support structure 42. The support plate 41 is rigidly secured to shaft 47, which is pivotally secured to main plate 46 by swivel joint or bearing 45. The pivoting assembly 44 enables attachment pad 30 to pivot about bearing 45, thereby allowing the operator to easily attach the attachment pad to a surface which is initially at an angle to the surface of the pad. Furthermore, support structures 42 may be fabricated from rubber, wound spring material or any material capable of absorbing minor compressive loads, thereby acting as shock absorbers and preventing impact damage to the attachment pad or the attachment surface during the attachment sequence. In addition, the attachment pad 30 includes a circular bumper, designated by 40, fabricated from rubber or other suitable material and designed to prevent damage to the attachment pad and the attachment surface and marring of the attachment surface from contact with exposed edges of the attachment pad.

Figure 4:
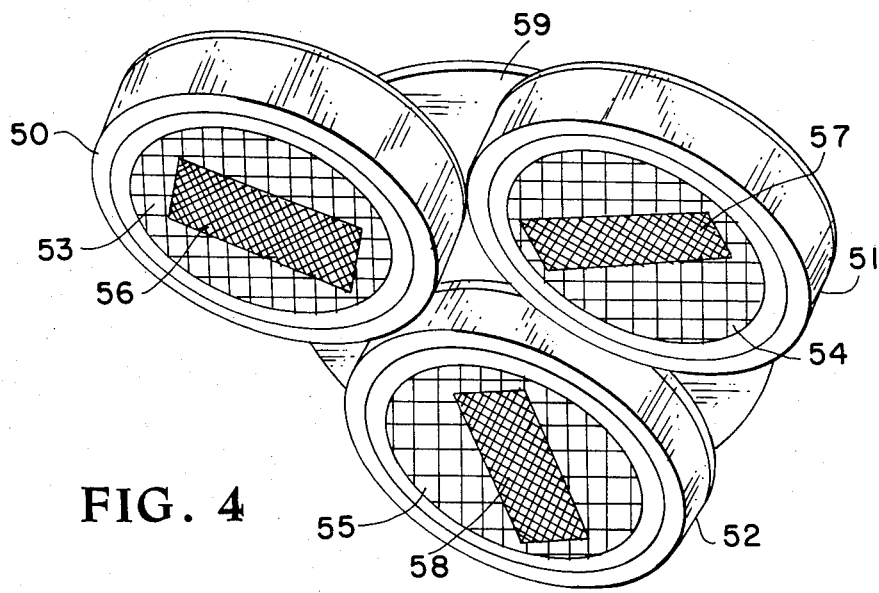
FIG. 4 is a perspective view of three attachment pads mounted on a swivel assembly.

FIG. 4 shows a perspective view of an alternate embodiment of the invention employing three attachment pads 50, 51 and 52 and the respective cloth surfaces, 53, 54 and 55, and hot melt adhesive charges, 56, 57 and 58. Although three attachment pads are illustrated, in practice any number of pads may be employed. Each of the attachment pads may be pivotally or rigidly secured to main plate 59. In the embodiment where each of the attachment pads are pivotally connected to main plate 59, the pads may be oriented at an angle to the main plate and at angles to each other, thereby permitting the operator to attach the three pad complex to a variety of uneven or curved surfaces, such as the exterior of a space vehicle.

The operation of the present invention is now believed apparent. The operator selectively activates the thermo-foil heater, which resistively heats the fiberglass cloth and the hot melt adhesive charge to a predetermined temperature, usually 280°-350° F., causing the adhesive to soften or melt. The thermocouple senses the pad temperature and transmits that temperature signal to the temperature controller which maintains the desired temperature range. The temperature controller may be programmed to maintain different temperature ranges for a variety of hot melt adhesives. The operator then positions the attachment pad such that the fiberglass cloth contacts the desired attachment surface, wherein the semi-liquid adhesive wets the attachment surface. The operator activates the cooling phase, wherein the cooling mechanism rapidly reduces the temperature of the pad and the adhesive, causing the adhesive to resolidify and bond the attachment pad to the attachment surface. The heating cycle may be reactivated to melt the solidified adhesive and permit the operator to readily detach the bonded pad. The thermo-cooler may be used as a supplemental or backup heater by reversing the current to the thermo-cooler to effect emergency release of the pad.

Figure 5:
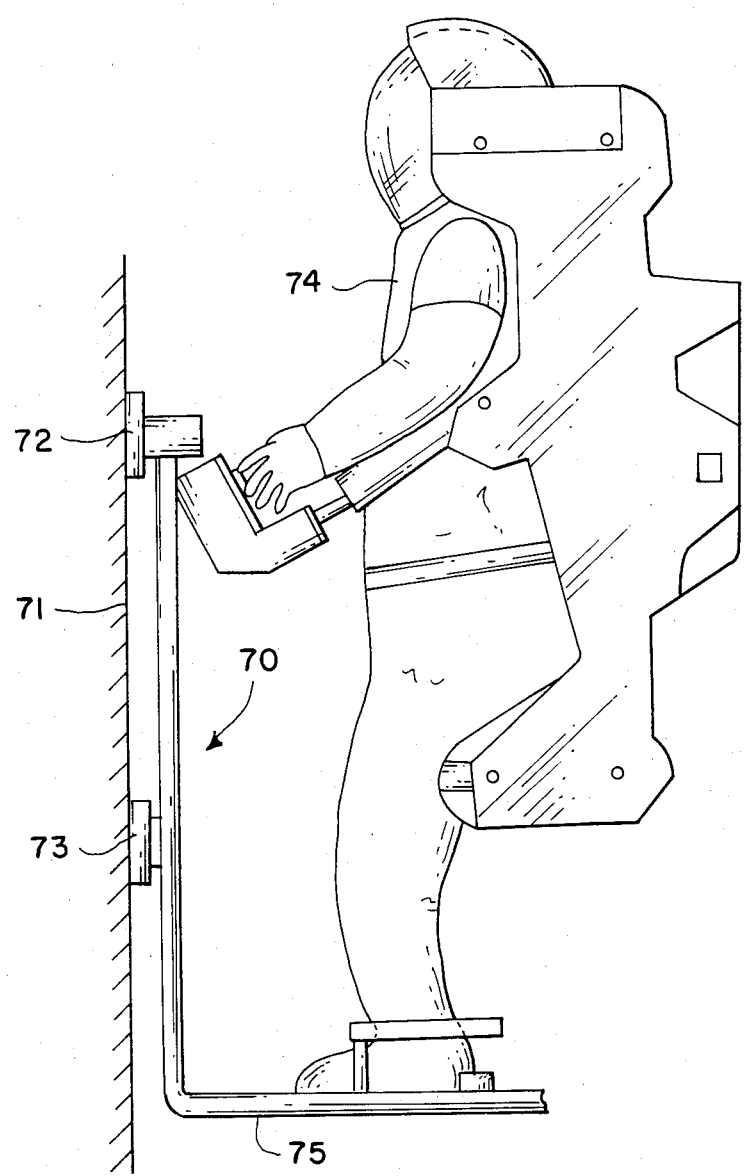
FIG. 5 is a side view of an astronaut work restraint unit employing attachment pads to releasably secure the work restraint unit to the exterior of a space vehicle.

FIG. 5 shows the attachment pad used in conjunction with the Space Shuttle work restraint unit, generally designated by reference numeral 70. The work restraint unit 70 includes a scaffolding or platform 75 and is releasably attached to the Space Shuttle thermal protective tiles or other areas of the vehicle exterior 71, thereby permitting extravehicular work by the astronaut 74 during the orbital portion of a space mission. The work restraint unit permits freedom of movement by the astronaut in making repairs to the vehicular exterior or for other work requiring the use of two hands. In the illustrated embodiment, the work restraint unit is provided with two hot melt adhesive attachment pads 72 and 73 that serve as releasably attached contact points for the work restrain unit. By securing the work restaint unit to a particular segment of the vehicle exterior via the releasable attachment pads, needed repairs on the vehicle at a specific location may be conducted. The attachment pads may be detached and the work restraint unit may be moved and reattached to a different area of the vehicle as desired.

Figure 6:
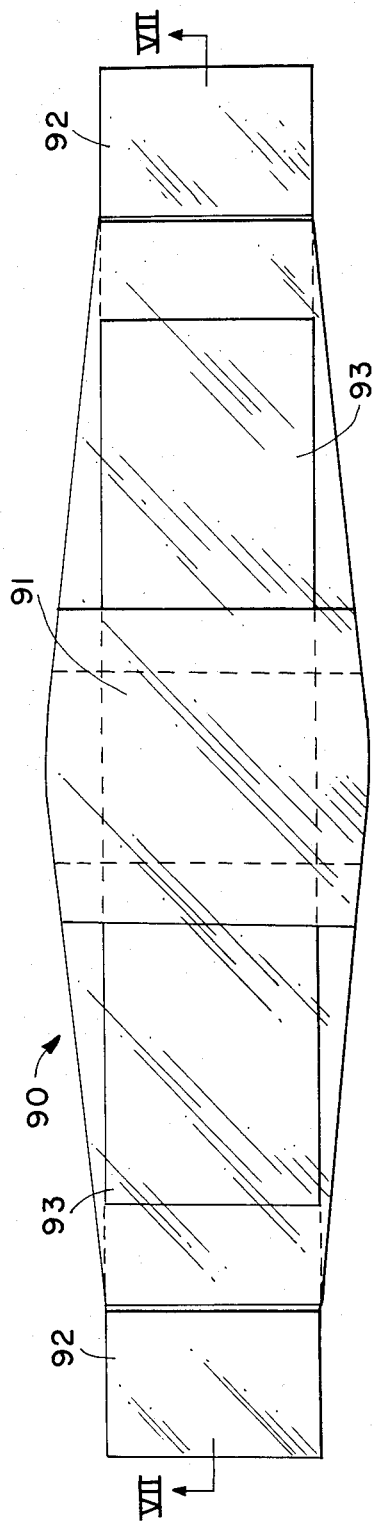
FIG. 6 is a top view of a hot melt adhesive package utilized to recharge the invention attachment pad.
Figure 7:
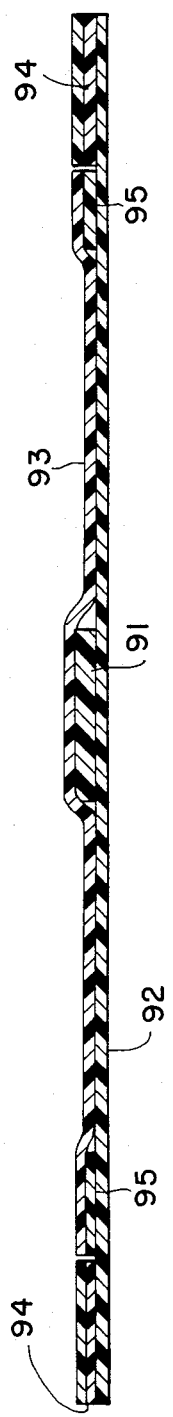
FIG. 7 is a sectional view of the hot melt adhesive attachment package taken along line VII—VII of FIG. 6.

After detachment of a prior art attachment complex, a quantity of adhesive is usually deposited on the attachment surface, thereby depleting the adhesive charge on the surface of the attachment complex and preventing reattachment at another site. However, the cloth surface of the attachment pad of the present invention effectively retains a sufficient quantity of adhesive for several repeated attachment/detachment sequences. When the adhesive charge has been depleted after a number of attachment/detachment sequences, the operator may easily replenish the adhesive by using a "Hot Melt Recharge System", described in NASA Invention Disclosure No. LAR 12881-1, and filed in the Patent Office, Ser. No. 361,215, on Mar. 24, 1982. FIGS. 6 and 7 show the hot melt recharge system 90, which is comprised of a charge or film of hot melt thermoplastic adhesive 91 sandwiched between two layers or sheets of protective film strips 92 and 93. Suitable non-adhering tab ends 94 and 95 are provided on each end of both film strips, enabling the operator to peel off one film strip 92 and expose a surface of the hot melt adhesive 91. This exposed surface of adhesive is disposed abutting the heater area of the cloth surface of the attachment pad and retained in position while heated to the melt or softening temperature of the adhesive. The adhesive 91 is then cooled to the solidifying temperature and thus becomes permanently affixed to the cloth surface of the attachment pad. The remaining protective film strip 93 is peeled from the cooled adhesive charge 91. Such a recharge process may be successfully accomplished even by a space-suited astronaut under adverse gravity-free conditions.

Accordingly, the hot melt adhesive attachment pad of the present invention clearly improves on prior art devices using hot melt adhesives. The cloth surface of the attachment pad effectively retains the adhesive charge, permitting repeated attachment/detachment sequences, a feature heretofore unavailable in the prior art. Furthermore, the cloth provides a soft, cushioned surface, which in conjunction with the rubber bumper and shock absoring structures prevents damage to or marring of the attachment surface and damage to the attachment pad during the attachment sequence. Moreover, the active cooling system facilitates rapid solidification of the adhesive and bonding of the attachment pad, even in a spatial vacuum environment. In addition, the thermo-cooler may be operated as a supplemental or backup heater with emergency detachment of the pad. Still further, the invention attachment pad may be used with a wide variety of hot melt adhesives with a variety of melting ranges.

Although the invention is described relative to space applications, it is not so limited. For example, the hot melt attachment pad would prove valuable in the construction industry to support a person or scaffolding or to provide a tether for tools. Accordingly, many configurations are considered within the scope of the present invention as the specific application may dictate. Thus, the invention may be practiced other than as specifically described in reference to the detailed embodiments given herein. Numerous variations and modifications within the scope of the appended claims will be readily apparent to those skilled in the art in light of the above teachings.

What is claimed as new and desired to be secured by Letters Patent of the United States is:

1. A hot melt adhesive attachment pad comprising:
   cloth means, said cloth means having top surface means and bottom surface means;
   a charge of hot melt adhesive seletively impregnated on said top surface means of said cloth;
   heating means, said heating means being oriented in close proximity to said bottom surface means in order to heat said cloth means and melt said charge of hot melt adhesive;
   cooling means, said cooling means being oriented adjacent to said bottom surface means in order to cool said cloth means and solidify said charge of hot melt adhesive;
   mounting means, wherein said cloth means, said heating means and said cooling means are securely held in said mounting means and said mounting means is shaped to form a head assembly; and
   temperature control means for controlling the temprature of said heating and cooling means.

2. A hot melt adhesive attachment pad as in claim 1 wherein said temperature control means comprises a temperature sensing means which senses the temperature of said cloth means and control means.

3. A hot melt adhesive attachment pad as in claim 2 wherein said temperature sensing means is a thermocouple.

4. A hot melt adhesive attachment pad as in claim 1 wherein said cloth means is a fiberglass cloth.

5. A hot melt adhesive attachment pad as in claim 1 wherein said heating means is a thermo-foil heater.

6. A hot melt adhesive attachment pad as in claim 1 wherein said cooling means comprises a thermo-cooler and heat sink means, and said heat sink means is adjacent to said thermo-cooler and conducts heat away from said thermo-cooler.

7. A hot melt adhesive attachment pad as in claim 6 wherein said heat sink means is a metal plate.

8. A hot melt adhesive attachment pad as in claim 6 wherein said heat sink means has a serrated surface and is coated with a high emittance material for improved heat transfer in a spatial vacuum environment.

9. A hot melt adhesive attachment pad as in claim 6 wherein said thermo-cooler may be operated as a heater to supplement or substitute said heating means to permit emergency release of a bonded attachment pad.

10. A hot melt adhesive attachment pad as in claim 1 wherein said mounting means is a mounting ring.

11. A hot melt adhesive attachment pad as in claim 1 wherein said mounting means is two mounting rings and the fringe of said cloth means is sandwiched between the opposing faces of said mounting rings in order to securely hold said cloth means.

12. A hot melt adhesive attachment pad as in claim 1 wherein said mounting means includes a bumper means oriented at the exposed edge of said mounting means and adjacent to said top surface means of said cloth means in order to prevent impact damage to the attachment pad or attachment surface and to prevent marring of the attachment surface.

13. A hot melt adhesive attachment pad as in claim 1 wherein said attachment pad is connected to a support plate.

14. A hot melt adhesive attachment pad as in claim 13 wherein said support plate is connected to said attachment pad by shock absorber means which is constructed and oriented in order to prevent damage to said attachment pad or the attachment surface during the attachment sequence.

15. A hot melt adhesive attachment pad as in claim 14 wherein said shock absorber means are rubber shafts.

16. A hot melt adhesive attachment pad as in claim 13 wherein said support plate is pivotally connected to a main plate, thereby enabling said attachment pad to be attached to a surface at an angle to said main plate.

17. A hot melt adhesive attachment pad as in claim 16 wherein said attachment pad is connected to a number of attachment pads which are themselves connected, thereby forming a hot melt adhesive attachment complex.

18. A hot melt adhesive attachment pad as in claim 17 wherein said attachment pad is pivotally connected to a number of attachment pads which are themselves pivotally connected, thereby permitting attachment of said attachment pads at an angle to said main plate and at angles to each other.

* * * * *